(12) United States Patent
Papa et al.

(10) Patent No.: US 11,496,875 B2
(45) Date of Patent: *Nov. 8, 2022

(54) ENABLING HIGH-POWER UE TRANSMISSION

(71) Applicant: Parallel Wireless, Inc., Nashua, NH (US)

(72) Inventors: Steven Paul Papa, Windham, NH (US); Rajesh Kumar Mishra, Westford, MA (US); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 476 days.

This patent is subject to a terminal disclaimer.

(21) Appl. No.: 16/460,228

(22) Filed: Jul. 2, 2019

(65) Prior Publication Data

US 2020/0162877 A1    May 21, 2020

Related U.S. Application Data

(63) Continuation of application No. 15/716,428, filed on Sep. 26, 2017, now Pat. No. 10,341,837, which is a
(Continued)

(51) Int. Cl.
*H04W 4/90* (2018.01)
*H04W 72/04* (2009.01)
(Continued)

(52) U.S. Cl.
CPC ........... *H04W 4/90* (2018.02); *H04W 52/143* (2013.01); *H04W 52/146* (2013.01);
(Continued)

(58) Field of Classification Search
CPC ... H04W 4/90; H04W 52/143; H04W 52/146; H04W 52/281; H04W 52/367; H04W 72/04; H04W 72/0426; H04W 52/243
See application file for complete search history.

(56) References Cited

U.S. PATENT DOCUMENTS 5,926,133 A * 7/1999 Green, Jr. ............... H01Q 21/06
                                                        342/363
5,930,684 A * 7/1999 Keskitalo ............ H04W 52/281
                                                         455/69

(Continued)

OTHER PUBLICATIONS

O. T. W. Yu and V. C. M. Leung, "Adaptive resource allocation for prioritized call admission over an ATM-based wireless PCN," in IEEE Journal on Selected Areas in Communications, vol. 15, No. 7, pp. 1208-1225, Sep. 1997. (Year: 1997).*

(Continued)

*Primary Examiner* — Nathan A Mitchell
(74) *Attorney, Agent, or Firm* — Michael Y. Saji; David W. Rouille

(57) ABSTRACT

Systems and methods are disclosed for permitting higher transmit power at a mobile device. In one embodiment, a method is disclosed, comprising: receiving, at a base station, an emergency request from a mobile device; sending, from the base station to a neighboring base station, a high power reservation message to reserve one or more radio resource blocks at the neighboring base station for non-use; and sending, from the base station to the mobile device, a resource allocation including the one or more radio resource blocks and a power control message requesting high transmit power.

16 Claims, 4 Drawing Sheets

Related U.S. Application Data continuation of application No. 14/868,074, filed on Sep. 28, 2015, now Pat. No. 9,775,017.

(60) Provisional application No. 62/056,455, filed on Sep. 26, 2014.

(51) Int. Cl.
*H04W 52/14* (2009.01)
*H04W 52/28* (2009.01)
*H04W 52/36* (2009.01)
*H04W 52/24* (2009.01)

(52) U.S. Cl.
CPC ....... *H04W 52/281* (2013.01); *H04W 52/367* (2013.01); *H04W 72/04* (2013.01); *H04W 52/243* (2013.01); *H04W 72/0426* (2013.01)

(56) References Cited

U.S. PATENT DOCUMENTS

| | | | | |
|---|---|---|---|---|
| 6,289,211 | B1 * | 9/2001 | Koorapaty | H04W 64/00 455/404.2 |
| 2005/0026622 | A1 * | 2/2005 | Georgeaux | H04W 48/02 455/450 |
| 2006/0281423 | A1 * | 12/2006 | Caimi | H01Q 9/045 455/129 |
| 2008/0232304 | A1 * | 9/2008 | Mooney | H04W 74/0875 370/328 |
| 2008/0311881 | A1 * | 12/2008 | Taaghol | H04L 67/14 455/404.2 |
| 2009/0054057 | A1 * | 2/2009 | Goldman | H04W 52/367 455/424 |
| 2010/0135205 | A1 * | 6/2010 | Li | H04W 4/90 370/328 |
| 2010/0266107 | A1 * | 10/2010 | Brusilovsky | H04W 76/50 379/46 |
| 2011/0105109 | A1 * | 5/2011 | Uemura | H04W 4/90 455/422.1 |
| 2012/0040619 | A1 * | 2/2012 | Zhu | H04W 72/082 455/63.1 |
| 2012/0178482 | A1 * | 7/2012 | Seo | H04L 1/1854 455/501 |
| 2012/0269062 | A1 | 10/2012 | Cho | |
| 2013/0272274 | A1 | 10/2013 | Ishida et al. | |
| 2013/0281089 | A1 * | 10/2013 | Chandrasekhar | H04W 24/10 455/434 |
| 2014/0079009 | A1 | 3/2014 | Liu et al. | |
| 2014/0161060 | A1 | 6/2014 | Nam et al. | |
| 2014/0226513 | A1 | 8/2014 | Hapsari et al. | |
| 2014/0335864 | A1 * | 11/2014 | Toyoda | H04W 76/15 455/436 |
| 2015/0056995 | A1 | 2/2015 | Baillargeon | |
| 2015/0111608 | A1 * | 4/2015 | Kazmi | H04W 52/34 455/522 |
| 2015/0207700 | A1 | 7/2015 | Elmdahl et al. | |
| 2016/0127913 | A1 | 5/2016 | Li et al. | |
| 2016/0262114 | A1 | 9/2016 | Chen et al. | |

OTHER PUBLICATIONS

P. Ramanathan, K. M. Sivalingam, P. Agrawal and S. Kishore, "Dynamic resource allocation schemes during handoff for mobile multimedia wireless networks," in IEEE Journal on Selected Areas in Communications, vol. 17, No. 7, pp. 1270-1283, Jul. 1999. (Year: 1999).*

NTT Docomo: "Downlink Interference Coordination Between eNodeB and Home eNodeB", TSG-RAN Working Group 4 (Radio) meeting #52, R4-093203, Shenzhen, Aug. 24-28, 2009, all pages. (Year: 2009).*

* cited by examiner

ENABLING HIGH-POWER UE TRANSMISSION

CROSS-REFERENCE TO RELATED APPLICATIONS

This application is a continuation of, and claims the benefit of an earlier filing date under 35 USC 120 based on, U.S. patent application Ser. No. 15/716,428, filed Sep. 26, 2017, entitled "Enabling High-Power UE Transmission," which itself is a continuation of, and claims the benefit of an earlier filing date under 35 USC 120 based on, U.S. patent application Ser. No. 14/868,074, filed Sep. 26, 2015, entitled "Enabling High-Power UE Transmission,", U.S. Pat. No. 9,775,017, which itself claims the benefit of priority under 35 USC 119(e) to U.S. Provisional Patent Application No. 62/056,455, entitled "Enabling High-Power UE Transmission," filed on Sep. 26, 2014, each of which are hereby incorporated by reference in their entirety for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; and U.S. patent application Ser. No. 14/571,250, entitled "Virtualization of the Evolved Packet Core to Create a Local EPC," filed on Dec. 15, 2014.

BACKGROUND

Small cells and mobile base stations are being considered for many applications, including first responder and public safety applications. These cells are capable of bringing LTE access directly to the site of a disaster or emergency, as described in U.S. patent application Ser. No. 14/183,176, which is hereby incorporated by reference for all purposes. However, it is well-known that many LTE bands are at high frequencies, such as 1900 MHz, 2400 MHz, or even higher. As higher frequencies have worse penetration with more attenuation, these small base stations have the problem that even when deployed to the site, they may not be able to provide access and coverage areas deep into buildings or into basements. As well, when buildings are on fire or when buildings are collapsing, it is conceivable that the people who need to make emergency calls will be in the interior of such buildings. Further, when a building is on fire, the residents inside need to reach as wide a coverage area as they can to seek emergency support. To support scenarios like these, high-power transmission from the user equipment (UE) may be enabled.

A need therefore exists to provide improved quality of radio coverage to those emergency users.

SUMMARY

Systems and methods are disclosed for permitting higher transmit power at a mobile device. In one embodiment, a method is disclosed, comprising: receiving, at a base station, an emergency request from a mobile device; sending, from the base station to a neighboring base station, a high power reservation message to reserve one or more radio resource blocks at the neighboring base station for non-use; and sending, from the base station to the mobile device, a resource allocation including the one or more radio resource blocks and a power control message requesting high transmit power.

The method may further comprise identifying whether the emergency request may be an emergency call request or indicates emergency status. The method may further comprise identifying radio resources based on usage of radio resources by nearby mobile devices, nearby base stations, or both. The method may further comprise coordinating scheduling with a coordinating node via an X2 protocol message.

The base station may be an eNodeB, the mobile device may be a user equipment (UE), and the high power reservation message may be a High Interference Indicator (HII) message communicated via an X2 protocol message. The high power reservation message may comprise a High Interference Indicator (HII) message and a Relative Narrowband Transmit Power (RNTP) message. The emergency request may be an emergency attach request without user equipment device authentication. The emergency request may be a request to make an emergency call. The power control message identifies the one or more radio resource blocks. The one or more radio resource blocks are resource blocks designated by frequency or time. The mobile device may be directed to use its maximum transmit power for uplink transmission to the base station. The base station may use a higher transmit power for downlink transmission to the mobile device.

In another embodiment, a base station is disclosed, comprising: a processing module for providing wireless communications to mobile users; a core network interface coupled to the processing module and in communication with a core network; and an access interface coupled to the processing module, in communication with one or more mobile devices, and capable of being used for emergency communications by the one or more mobile devices; wherein the processing module may be configured to: receive, at the base station, an emergency request from a mobile device; send, from the base station to a neighboring base station, a high power reservation message to reserve one or more radio resource blocks at the neighboring base station for non-use; and send, from the base station to the mobile device, a resource allocation including the one or more radio resource blocks and a power control message requesting high transmit power.

The base station may be an eNodeB, the mobile device may be a user equipment (UE), and the high power reservation message may be a High Interference Indicator (HII) message communicated via an X2 protocol message. The high power reservation message may comprise a High Interference Indicator (HII) message and a Relative Narrowband Transmit Power (RNTP) message. The emergency request may be an emergency attach request without user equipment device authentication. The emergency request may be a request to make an emergency call. The power control message identifies the one or more radio resource blocks. The one or more radio resource blocks are resource blocks designated by frequency or time. The mobile device may be directed to use its maximum transmit power for uplink transmission to the base station.

DETAILED DESCRIPTION

Figure 1:
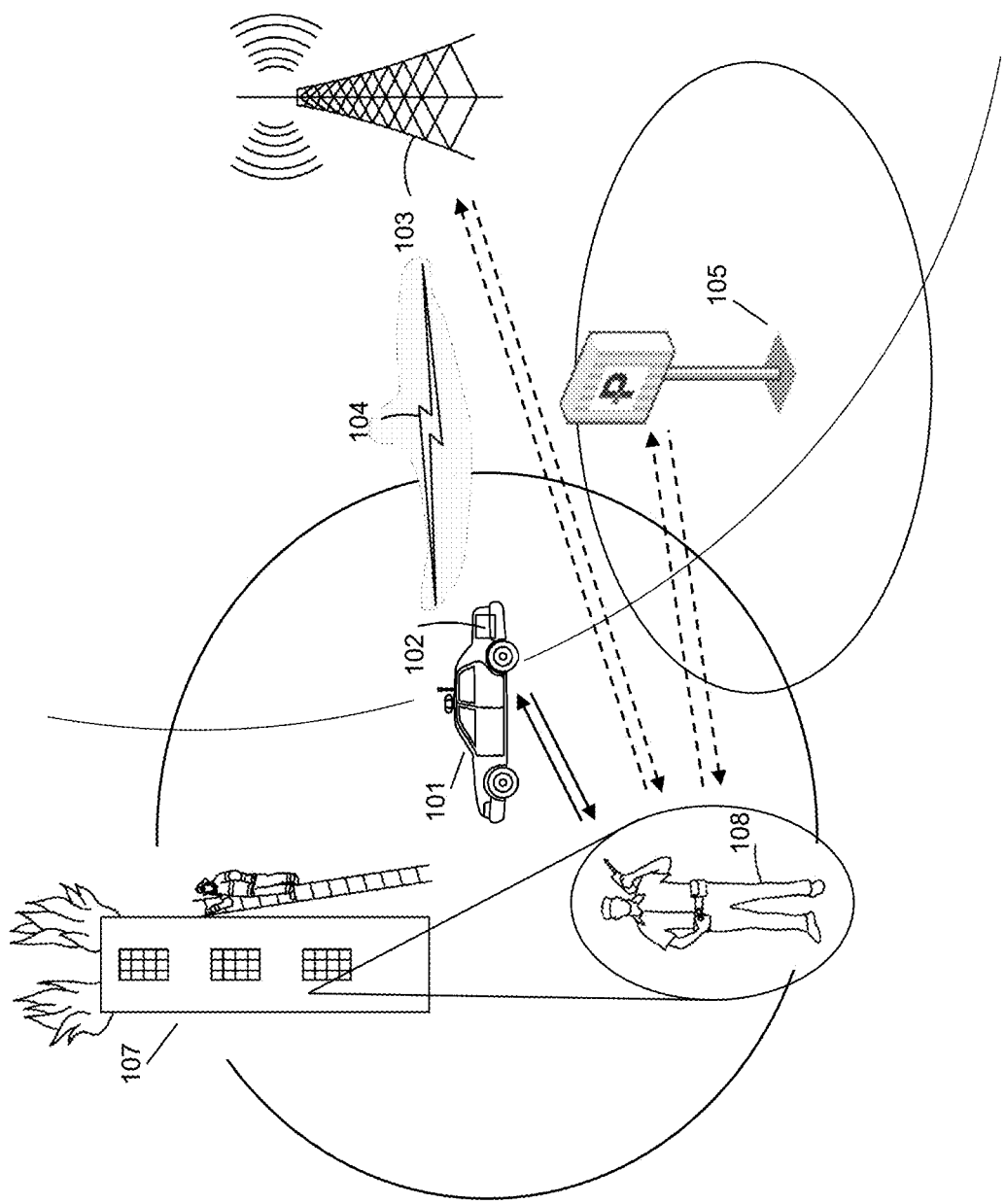
FIG. 1 is a schematic diagram of a deployment scenario, in accordance with some embodiments.

As mentioned above, a need exists to provide improved quality of radio coverage to those emergency users.

One way to improve service to emergency users is to permit them to use higher power when making an emergency call. However, such high-power transmission could cause unintended or adverse consequences, such as unacceptable levels of uplink interference. This negative impact can be resolved using interference coordination between base stations in the network, as described below.

The 3GPP LTE standard contemplates inter-cell interference cancellation, or ICIC. Typically, eNodeBs exchange interference information of their cells with the neighbor eNBs by sending an X2 message (Load Information message3) after each ICIC period. At this time, the message includes information like Relative Narrowband Transmit Power (RNTP), High-Interference Indicator (HII), and Overload Indicator (OI).

The RNTP message indicates the frequency resources (RBs) that will be using high transmit power for downlink during the next ICIC period. Power strength of each RB is measured over the current ICIC period and shown in bits (0: low, 1: high). For example, the strength can be averaged over the current ICIC period.

The HII message indicates frequency resources (RBs) that will be using high Tx power for UL during the next ICIC period, just like RNTP, but for UL this time. RBs with high allocated power are used by UEs at cell edges, and thus are very likely to cause interference for neighbor cells. The power strength of each RB is measured and shown in bits (0: low, 1: high).

RNTP and HII are information about interference to be caused by a cell to its neighbor cell. However, as OI is information about interference that has already been caused by the neighbor cell to the cell during the last ICIC period, it is not contemplated here.

ICIC may include the following operations: generating interference information (ICIC period #11), wherein Cell A and B measure signal/interference strength during an ICIC period, and generate interference information (RNTP, HII, OI); sharing interference information (ICIC period #12), wherein Cell A and B share the interference information with neighbor cells through X2 message, and wherein the X2 delay between neighbor cells must be shorter than the ICIC period; resource coordination: ICIC calculation (ICIC period #12), wherein both cells and, in some embodiments, a coordinating node, run an ICIC algorithm based on the neighbor cell's interference information received, and determine frequency resources (RBs or sub-carriers) that will be used at cell edges, and thus will be using high Tx power; and coordinating resource-based local scheduling (ICIC period #13). The results of ICIC calculation are applied to one or more schedulers located at cell A, cell B, and/or other schedulers. Based on coordinated resources, cells perform local scheduling (i.e. allocating radio resources to the UEs accessed to them) depending on the channel status of each UE.

In some embodiments, the UE may initiate an emergency call request. In response to the UE's emergency call request, the eNodeB to which it is attached, which may be a multi-radio access technology (multi-RAT) mobile wireless mesh base station, may be enabled to work with a coordination node incorporating a scheduler, which may be part of a self-organizing network (SON) module. The SON module may choose specific uplink radio blocks/physical resource blocks (PRBs) that will cause the least uplink interference to adjacent eNodeBs, and send these blocks to the UE. The SON module may also permit the UE to use high transmission power to this UE for this emergent call.

In anticipating the potential uplink interference effect introduced by this call, the coordinating node, which may also be an X2 aggregation point, can use X2 interfaces to send the High Interference Indicator (HII) message to related eNodeBs or neighbor eNodeBs, including the specific PRBs that were assigned. With the receipt of these HII messages, the eNodeBs that have been notified will exclude the PRBs as indicated in the HII messages from use, thus avoiding unnecessary uplink interference.

FIG. 1 is a schematic diagram of a deployment scenario, in accordance with some embodiments. Emergency vehicle 101 has an in-vehicle base station 102 connected via wireless backhaul 104 to macro cell 103. Also nearby is neighboring small cell 105. Emergency vehicle 101 is on its way to disaster site 107, where it will permit mobile devices to attach, such as UE 108, held by a mobile user. Dotted lines represent undesirable interference, and solid lines represent desired signal. As shown, both macro cell 103 and 105 generate uplink and downlink interference to UE 106, and vice versa. The desired signal is between UE 106 and emergency vehicle base station 102.

As shown, the coverage area of macro cell 103 includes in-vehicle base station 102, which uses this coverage to obtain wireless backhaul connection 104. However, although macro cell 103 does not have coverage of UE 106, it may still interfere, in some embodiments. Likewise, small cell 105 does not have an overlapping coverage area but may still interfere as well.

Disaster site 107 is shown as a building, and UE 106. It is well-known that the propagation of radio waves is negatively impacted by building walls, and that signal attenuation increases as higher-frequency bands are used. For example, a 700 MHz signal may penetrate a building well, but a 1900 MHz signal or 2.4 GHz signal, as may be used for PCS/LTE and Wi-Fi, respectively, will not penetrate the building well. However, as emergency vehicle 101 is outside the building, and as emergency vehicle 101 also does not have the electrical power or physical size needed to broadcast a strong signal, it is important to enable the UE to transmit with a strong signal and for the UE not to be subject to interference during its transmission.

Operation of the components shown in FIG. 1 may occur as follows, in some embodiments. Mobile base station 102 may permit UE 106 to attach, or may receive an emergency attach request. Mobile base station 102 may also be informed of, either directly by sampling/sniffing its local radio environment or indirectly via means of UE measurement reports or self-organizing network (SON) coordination messages from a coordination server (not shown), sources of interference in its neighborhood, here being macro cell 103 and small cell 105. Once mobile base station 102 receives an emergency attach request or emergency call request from UE 106, it may identify the emergency status of the call, identify a radio resource such as a resource block that should be used by the UE, and send a high interference indicator (HII), a relative narrowband transmit power (RNTP) message, or both to each of macro cell 103 and small cell 105.

This may be via a coordination server (not shown). The base station 102 may then inform UE 106 that it should use the designated radio resources, and that it should use a higher transmit power. This may result in improved quality of service for UE 106.

In some embodiments, the following conditions may apply. Mobile user 108 may be indoors and may have a UE with ordinary or low power. In-vehicle base station 102 may have a limited power budget and may broadcast a signal that does not propagate inside of the building. In some cases a cell coverage pattern may include small cell overlay and macro cell underlay, as shown in FIG. 1, and some or all of the neighboring cells may be caused not to interfere using X2 protocol messages. However, the systems and methods disclosed herein apply also to any conditions, regardless of whether these conditions apply.

Figure 2:
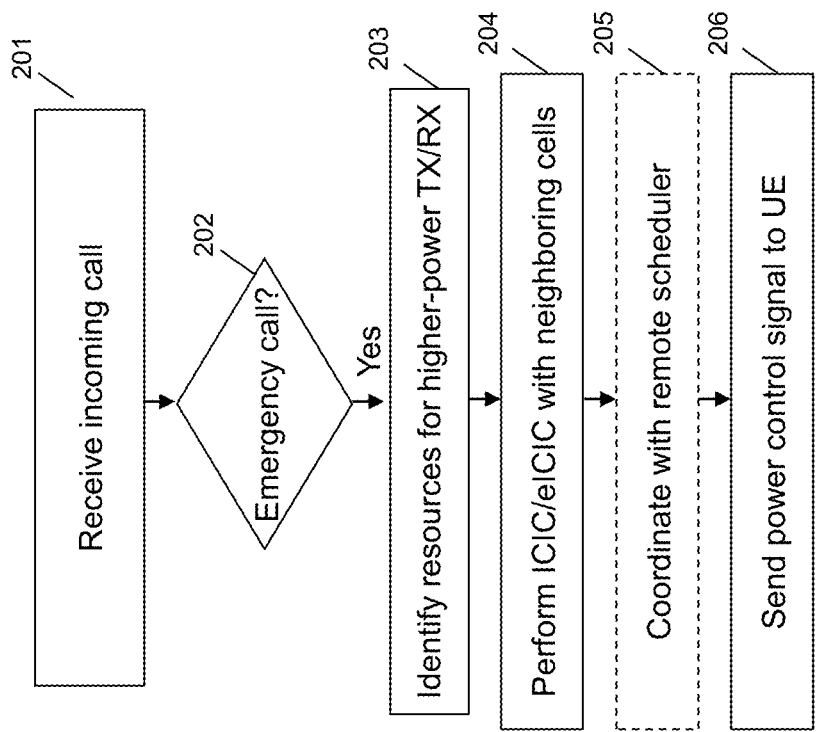
FIG. 2 is a flowchart of an emergency call coordination process, in accordance with some embodiments.

FIG. 2 is a flowchart of an emergency call coordination process, in accordance with some embodiments. At step 201, a base station receives an incoming call. This may be via an emergency attach message according to the LTE protocol. Alternately, it may be a circuit-switched call to a designated emergency number, such as 911 in the U.S., or a circuit-switched fallback call, or a voice over LTE (VoLTE) call, or an internet multimedia system (IMS) call, or a combination of the above.

At step 202, the base station attempts to determine whether the call is an emergency call. If the call is identified as an emergency call, the following steps may be performed. Identification of the call as an emergency call may occur in different ways. For example, an LTE UE may submit an emergency attach message to signal that it is attempting to attach to the network without authentication to place an emergency call. The attach message may indicate that it is an emergency attach. Alternately, a UE may attempt to attach without authenticating, which may be treated as an emergency attach. Alternately, an attach may be requested by a UE to a particular network that is a known emergency network. Alternately, a call may be initiated by an authenticated or attached UE that indicates that it is an emergency call. Alternately, an LTE UE may attempt a VoLTE emergency call, or an IMS emergency call. In some embodiments an emergency call may be identified using one or more of matching of the destination number, the destination packet gateway (PGW), the destination call session control function (CSCF), the requested quality of service, or any other special emergency flag in the request. Certain mobile devices may be given emergency call status for any call made on the device. It is understood that many methods for identifying emergency calls are understood, and each method would be equivalent to these methods, particularly if able to be performed at this stage.

At step 203, resources may be identified for higher-power transmission by the UE (uplink) as well as the base station (downlink). These resources may be time slots, frequency slots, resource blocks, or other resources such as are typically scheduled for uplink or downlink communications. These resources may be identified at a scheduler in the base station, a scheduler in a remote location (such as a baseband unit remotely located from a base station radio head), or in another type of scheduler. However, to meet the latency requirements of this application, a scheduler in the base station is preferred to be involved. The UE will use these identified resources to, for example, transmit at a higher power than is otherwise permitted. The higher transmit power may be higher power than any other UE. The higher power may be selected based on the radio frequency interference in the appropriate resource block, with consideration given to interference coordination with other cells (see below) and also to non-coordinated interference, such as path loss, other emission sources, building walls, foliage, or other interference.

As described in the preceding paragraph, resources may be identified for both receive and transmit, for both downlink and uplink. In some embodiments, high-power UE transmissions will be cleared using an HII message, and high-power base station transmissions will be cleared using an RNTP message. In some embodiments, high power may be used for one of the two links (e.g., UL only or DL only).

At step 204, the base station performs coordination steps to coordinate interference between cells, i.e., inter-cell interference coordination (ICIC). ICIC may be performed by the base station sending X2 protocol messages to other eNodeBs in the area.

Starting in 3GPP Release 8, ICIC involves generating interference information for each resource block, and exchanging this information with neighboring base stations through X2 messages, including a Load Information message that indicates what radio resources are subject to load and/or interference.

In some embodiments, the base station may send one or both of a Relative Narrowband Transmit Power (RNTP) and a High Interference Indicator (HII) to its neighboring base stations using X2 messages. The RNTP and HII messages may be used to protect the resources identified in step 203 for communication with the UE making the emergency call, on the downlink and uplink, respectively. One or both of RNTP and HII may be used for coordination. However, it is noted that both RNTP and HII should be used to provide improved service on both the uplink and downlink.

In some embodiments, one or both of ICIC and enhanced ICIC (eICIC) may be used. eICIC permits resource block allocation and interference coordination in the time domain, which can be combined with coordination in the frequency domain via ICIC.

At step 205, the base station may coordinate with one or more remote schedulers. This step is optional in some embodiments. In some embodiments, ICIC may be performed in conjunction with a coordination node that is responsible for coordinating multiple eNodeBs or base stations. The ICIC coordination may take the form of X2 messages that contain scheduling hints. The scheduling hints may involve one or more schedulers explicitly assigning particular resource blocks to particular UEs. The scheduling hints may involve information about transmit power, interference, signal quality, network congestion, handover prediction, interference prediction, or other information that may apply to one or more base stations coordinated by the coordination node.

At step 206, the resources identified in step 203 are transmitted to the UE, via normal channels, such as using a regularly-scheduled LTE physical downlink control channel (PDCCH) for downlink resources. As ICIC scheduling information is transmitted every tens to hundreds of milliseconds for LTE protocol systems, the latency budget for performing steps 201-206 may be within this timeframe. Ideally, the latency budget may be as close as possible to, or less than, a single scheduling period or transmission time interval (TTI), 1 ms.

In some embodiments, the base station may be a mobile base station being deployed to a disaster site. For instance, a mobile base station may arrive on the scene while a widespread emergency is still going on. In such situations, calls that are not emergency calls, such as ordinary voice calls, or any and all calls may be identified as emergency calls and given permission to use higher transmit power.

In some embodiments, public safety communications using a designated band, such as LTE Band 14 in the U.S., may receive preferential treatment as if they were emergency calls according to the methods described herein. This ensures that public safety personnel are able to perform their duties and communicate effectively with each other even when they are relying on a low-power mobile base station.

In some embodiments, the disclosed systems and methods may coexist with other services that are offered to facilitate emergency calling, such as location identification of the UE, prioritized quality of service, prioritized use of signaling channels, prioritized routing, or other emergency calling methods.

In some embodiments, a large number of UEs may attempt to attach to a base station as emergency UEs. For example, if a mobile base station is the only base station nearby at a disaster scene, many UEs may attempt to connect to the mobile base station. The mobile base station may use the systems and methods disclosed herein to provide priority access to emergency calls to the extent possible. For example, the mobile base station may declare, using HII and RNTP messages, that several or all available resource blocks will be needed for emergency calling. In some embodiments, guard bands may be included as well, so that HII and RNTP may be used to reserve additional blocks on either side of a user's transmission.

Figure 3:
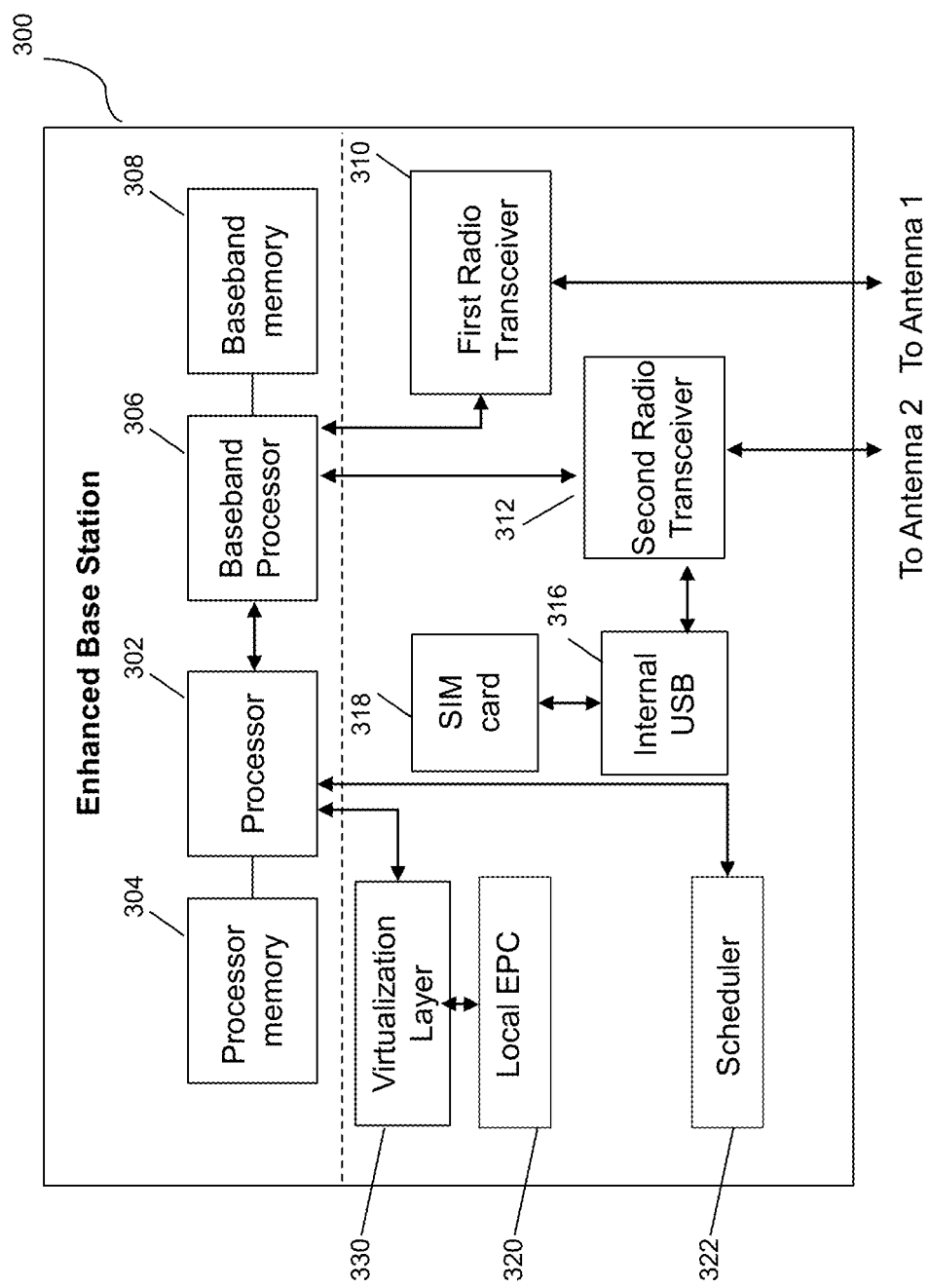
FIG. 3 is a schematic diagram of an enhanced base station, in accordance with some embodiments.

FIG. 3 is a schematic diagram of a mesh network base station, in accordance with some embodiments. Mesh network base station 300 may include processor 302, processor memory 304 in communication with the processor, baseband processor 306, and baseband processor memory 308 in communication with the baseband processor. Base station 300 may also include first radio transceiver 310 and second radio transceiver 312, internal universal serial bus (USB) port 316, and subscriber information module card (SIM card) 318 coupled to USB port 314. In some embodiments, the second radio transceiver 312 itself may be coupled to USB port 316, and communications from the baseband processor may be passed through USB port 316.

A virtualization layer 330 may also be included for mediating communications with an evolved packet core EPC, specifically including the core network EPC (not shown) and local evolved packet core (EPC) module 320. Local EPC 320 may be used for authenticating users and performing other EPC-dependent functions when no backhaul link is available. A scheduler module 322 may also be coupled to processor 302. The scheduler may be used for UEs connected to the base station, and in some cases may additionally be in communication with a coordination server, such as the one shown in FIG. 4, to perform scheduling and ICIC functions. Virtualization layer 330, local EPC 320, and scheduler 322 may each run on processor 302 or on another processor, or may be located within another device.

Processor 302 and baseband processor 306 are in communication with one another. Processor 302 may perform routing functions, and may determine if/when a switch in network configuration is needed. Baseband processor 306 may generate and receive radio signals for both radio transceivers 310 and 312, based on instructions from processor 302. In some embodiments, processors 302 and 306 may be on the same physical logic board. In other embodiments, they may be on separate logic boards.

The first radio transceiver 310 may be a radio transceiver capable of providing LTE eNodeB functionality, and may be capable of higher power and multi-channel OFDMA. The second radio transceiver 312 may be a radio transceiver capable of providing LTE UE functionality. Both transceivers 310 and 312 are capable of receiving and transmitting on one or more LTE bands. In some embodiments, either or both of transceivers 310 and 312 may be capable of providing both LTE eNodeB and LTE UE functionality. Transceiver 310 may be coupled to processor 302 via a Peripheral Component Interconnect-Express (PCI-E) bus, and/or via a daughtercard. As transceiver 312 is for providing LTE UE functionality, in effect emulating a user equipment, it may be connected via the same or different PCI-E bus, or by a USB bus, and may also be coupled to SIM card 318.

SIM card 318 may provide information required for authenticating the simulated UE to the evolved packet core (EPC). When no access to an operator EPC is available, local EPC 320 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Wired backhaul or wireless backhaul may be used to connect to a core network as well as to a coordination server, in some embodiments. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 310 and 312, which may be Wi-Fi 802.11a/b/g/n/ac/ad/ah, Bluetooth, Zig-Bee, microwave (including line-of-sight microwave), or another wireless backhaul connection. Any of the wired and wireless connections may be used for either access or backhaul, according to identified network conditions and needs, and may be under the control of processor 302 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks.

Figure 4:
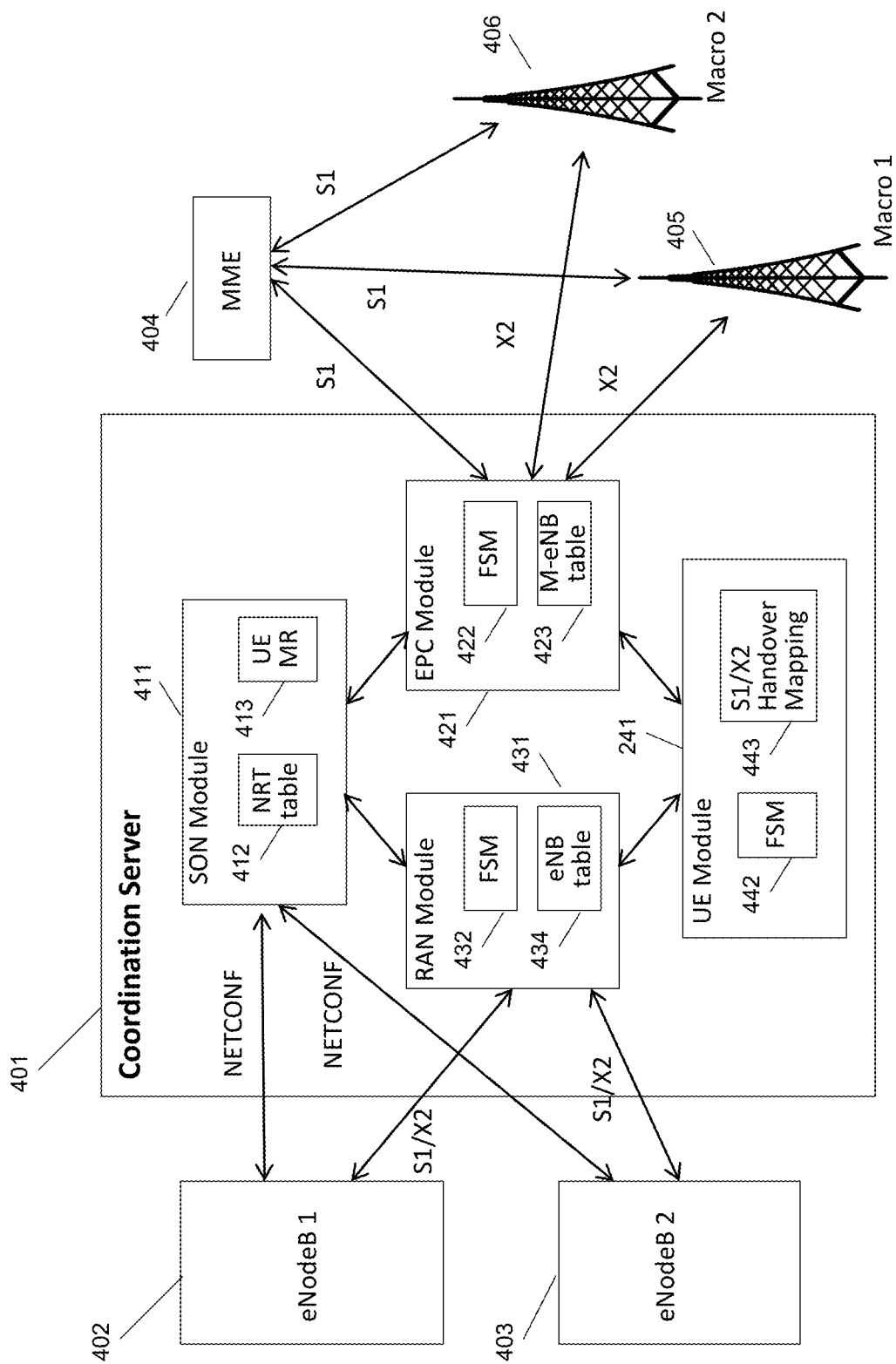
FIG. 4 is a schematic diagram of a coordination node, in accordance with some embodiments.

FIG. 4 is a schematic diagram of a coordination server in a Long Term Evolution (LTE) architecture, in accordance with some embodiments. Coordination server 401 provides services to, and is coupled to, eNodeB 402 and eNodeB 403, on a RAN side of a network (i.e., inside of the gateway). Coordination server 401 provides services to, and is coupled to, MME 404, macro eNodeB 405, and macro eNodeB 406, on a core network side of the network (outside of the gateway). Coordination server 401 corresponds to LAC 110, in some embodiments.

Within coordination server 401 are self-organizing network (SON) module 411, containing neighbor relation table (NRT) 412 and UE measurement report processing module 413; evolved packet core (EPC) module 421, containing EPC finite state machine module 422 and macro eNodeB table 423; radio access network (RAN) module 431, containing eNodeB finite state machine module 432 and eNodeB table 434; and user equipment (UE) module 441, containing UE finite state machine module 442 and S1/X2 handover mapping table 443. In some embodiments, SON module 411 may perform NRT maintenance, load information processing and fractional frequency reuse (FFR) processing; RAN module 431 may perform X2 association management with eNodeBs 402, 403; EPC module 421 may perform X2 association management with macro eNodeBs 405, 406; and UE module may perform X2 handover and S1/X2 translation between eNodeBs 402, 403 and macro eNodeBs 405, 406. Finite state machine modules 422, 432, 442 may include one or more states for modeling the operational state of a connected EPC, UE, or RAN, respectively. More than one FSM may be present at each of modules 421, 431, 441, so that coordination server 401 may be enabled to model the operational state of several network nodes at once. All the above managers/modules interact with each other to accomplish the assigned functionality.

In some embodiments, coordination server 401 may include one or more processors, each with one or more processor cores. Each of modules 411, 421, 431, and 441 are coupled to each other within coordination server 401, and may execute on one or more shared processors (not shown) coupled with memory (not shown). Coordination server 401 may include a real-time operating system, such as a Linux operating system, and may include an operating system that distributes tasks among multiple cores. Coordination server 401 may provide one or more of modules 411, 421, 431, 441 as processes, threads, user-mode or kernel-mode processes, processes in hardware or in software, in some embodiments. In some embodiments, each of modules 411, 421, 431, 441 may execute on the same coordination server 401; in other embodiments, these modules may execute on remote machines connected via a network. In some embodiments, a remote failover coordination server (not shown) may be made available for handling failures at coordination server 401. The failover mechanism may involve checkpointing operations at coordination server 401 in each of the modules therein. Certain operations may be hardware accelerated, such as network processing tasks, IPsec tasks, deep packet inspection tasks, or other tasks.

Coordination server 401 may include one or more network interfaces; these network interfaces may include Ethernet (10/100/1000/10000 Mbit) interfaces, Wi-Fi (802.11a/b/g/n/ac/af/ad) interfaces, 3G or 4G interfaces, virtual interfaces, or other interfaces. In some embodiments, one network interface may be directed towards the core network and located at, or coupled to, EPC module 421; this interface would communicate using the S1 protocol to MME 404 and using the X2 protocol to macro cells 405, 406. In some embodiments, another network interface may be directed towards one or more RANs internal to the gateway and connected to RAN module 431, for communicating to RANs 402, using either S1 or X2 as appropriate. Translation or interworking of protocols may occur at one or more of modules 411, 421, 431, or 441 as appropriate. In some embodiments, SON module 411 may also be coupled to an interface for communicating with RANs 402, 403; this interface may be labeled the SON interface, and the NETCONF protocol (XML over HTTPS) may be used to communicate in a proprietary or non-proprietary manner with RANs 402, 403 regarding network configuration, orchestration, and coordination operations.

In particular, in some embodiments, coordination server 401 may perform X2 brokering between eNodeB 402 and eNodeB 403 and other macro cells and the core network. For example, if an HII message is requested to be sent by eNodeB 402, it may be sent to coordination server 401, which may then send it to all other eNodeBs that require it, such as a macro cell or eNodeB 403.

Coordination server 401 may also, in some embodiments, handle scheduling and ICIC responsibilities in conjunction with eNodeBs 402 and 403. For example, coordination server 401 may communicate load or interference information from anywhere in the network to each eNodeB it is connected to, including information among eNodeBs. Coordination server 401 may also communicate resource reservations. In some embodiments, coordination server 401 may share scheduling responsibilities, and these responsibilities may be divided between the nodes.

Various further embodiments are contemplated as well. In some embodiments, once the UE completes its emergency call, the serving eNodeB or the UE itself may inform the coordinating node, and the coordinating node may then notify the set of related eNodeBs so that the associated PRBs may be rescheduled for use by any attached UE's subsequent uplink transmission.

In some embodiments, without HII notification from a coordinating node, the related eNodeBs can also use other schemes, like uplink spectrum power spectral density (PSD) sniffing solutions, to sniff the available uplink spectrum (safe to use) and only assign these (un-used) uplink PRBs.

In some embodiments, high-power transmission may be enabled via a self-organizing network (SON), X2 protocol communication, and/or radio frequency sniffing to identify interference or the lack thereof using a radio antenna and module at the base station, or via UE measurement reports.

In some embodiments, an overload indicator (OI) may also be transmitted.

In some embodiments, the coordination may be performed directly among nodes; in other embodiments it may be via a coordinating node.

In some embodiments, time blocks as well as resource blocks or frequency blocks may be blocked out using an HII message. In some embodiments, eICIC messages may be used in conjunction to or in place of the ICIC messages described herein. In some embodiments, eICIC may be used in conjunction with LTE-Advanced. In some embodiments, some scheduling may take place at a remote baseband location.

In some embodiments, high power may be requested by the base station to the UE. In other embodiments, the UE may request high power. In some embodiments, the UE may be given a specific power at which to transmit, and the specific power may be determined based on neighboring radio signal and interference conditions. In other embodiments, the UE may be told to use its maximum transmit power. In some embodiments, a power control message according to the LTE protocol may be used by the base station to request higher power from the UE.

In some embodiments, radio frequency signal in the vicinity of the UE and/or the base station may be considered, either using measurement reports, in some cases solicited from the UE, or using sniffing from the base station, or another means. In some embodiments, one or more of the following parameters may be used to evaluate radio frequency signal: received signal strength indication (RSSI), energy per bit to noise power spectral density (Eb/N0), signal-to-noise ratio (SNR), reference signal received power (RSRP), reference signal received quality (RSRQ), or any other parameters. In some embodiments, penetration loss may be incorporated into a determination of whether a high-power UE transmission is needed. In some embodiments, measurements of penetration may be used to develop a model for penetration loss therefor. In some embodiments, a base station may solicit a UE to perform high-power UE transmission.

In the present disclosure, the words "eNodeB" or "eNodeB" are used to refer to a cellular base station. However, one of skill in the art would appreciate that it would be possible to provide the same functionality and services to other types of base stations, specifically to home eNodeBs (HeNodeBs) and nodeBs, as well as any equivalents.

In the present disclosure, the words "federated," "virtualized," "proxy" or "proxied" may be viewed as aspects of the same concept. For example, it may be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
    receiving, at a base station, a request from a mobile device;
    coordinating a resource allocation with a self-organizing network (SON) module located at a coordinating node, the coordinating node being an X2 aggregation point;
    sending, from the base station to a neighboring base station, a High Interference Indicator (HII) message including physical resource blocks (PRBs) sending SON coordination messages from the coordinating node to the base station regarding sources of interference in the base station neighborhood; and
    excluding the PRBs from use to avoid unnecessary uplink interference.

2. The method of claim 1, further comprising identifying whether the request is an emergency call request or indicates emergency status.

3. The method of claim 1, further comprising identifying radio resources based on usage of radio resources by nearby mobile devices, nearby base stations, or both.

4. The method of claim 1, further comprising coordinating scheduling with the scheduler located at the neighboring base station via a scheduler located at the coordinating node via an X2 protocol message.

5. The method of claim 1, wherein the base station is an eNodeB, and the mobile device is a user equipment (UE).

6. The method of claim 2, wherein the emergency request is an emergency attach request without user equipment device authentication.

7. The method of claim 2, wherein the emergency request is a request to make an emergency call.

8. The method of claim 1, wherein the PRBs are resource blocks designated by frequency or time.

9. The method of claim 1, wherein the mobile device is directed to use its maximum transmit power for uplink transmission to the base station.

10. The method of claim 1, wherein the base station uses a higher transmit power for downlink transmission to the mobile device.

11. A base station, comprising:
   a processing module for providing wireless communications to mobile users;
   a core network interface coupled to the processing module and in communication with a core network; and
   an access interface coupled to the processing module, in communication with one or more mobile devices, and capable of being used for emergency communications by the one or more mobile devices;
   wherein the processing module is configured to:
      receive, at the base station, request from a mobile device;
      coordinate a resource allocation with a self-organizing network (SON) module located at a coordinating node, the coordinating node being an X2 aggregation point;
      send, from the base station to a neighboring base station, a High Interference Indicator (HII) message including physical resource blocks;
      sending SON coordination messages from the coordinating node to the base station regarding sources of interference in the base station neighborhood; and
   excluding the PRBs from use to avoid unnecessary uplink interference.

12. The base station of claim 11, wherein the base station is an eNodeB, and the mobile device is a user equipment (UE).

13. The base station of claim 11, wherein the request is an emergency attach request without user equipment device authentication.

14. The base station of claim 11, wherein the request is a request to make an emergency call.

15. The base station of claim 11, wherein the PRBs are resource blocks designated by frequency or time.

16. The base station of claim 11, wherein the mobile device is directed to use its maximum transmit power for uplink transmission to the base station.

* * * * *